Feb. 12, 1929.                    D. H. JOHANNESEN                    1,702,008
                                    VEHICLE SPRING
                                  Filed May 28, 1926
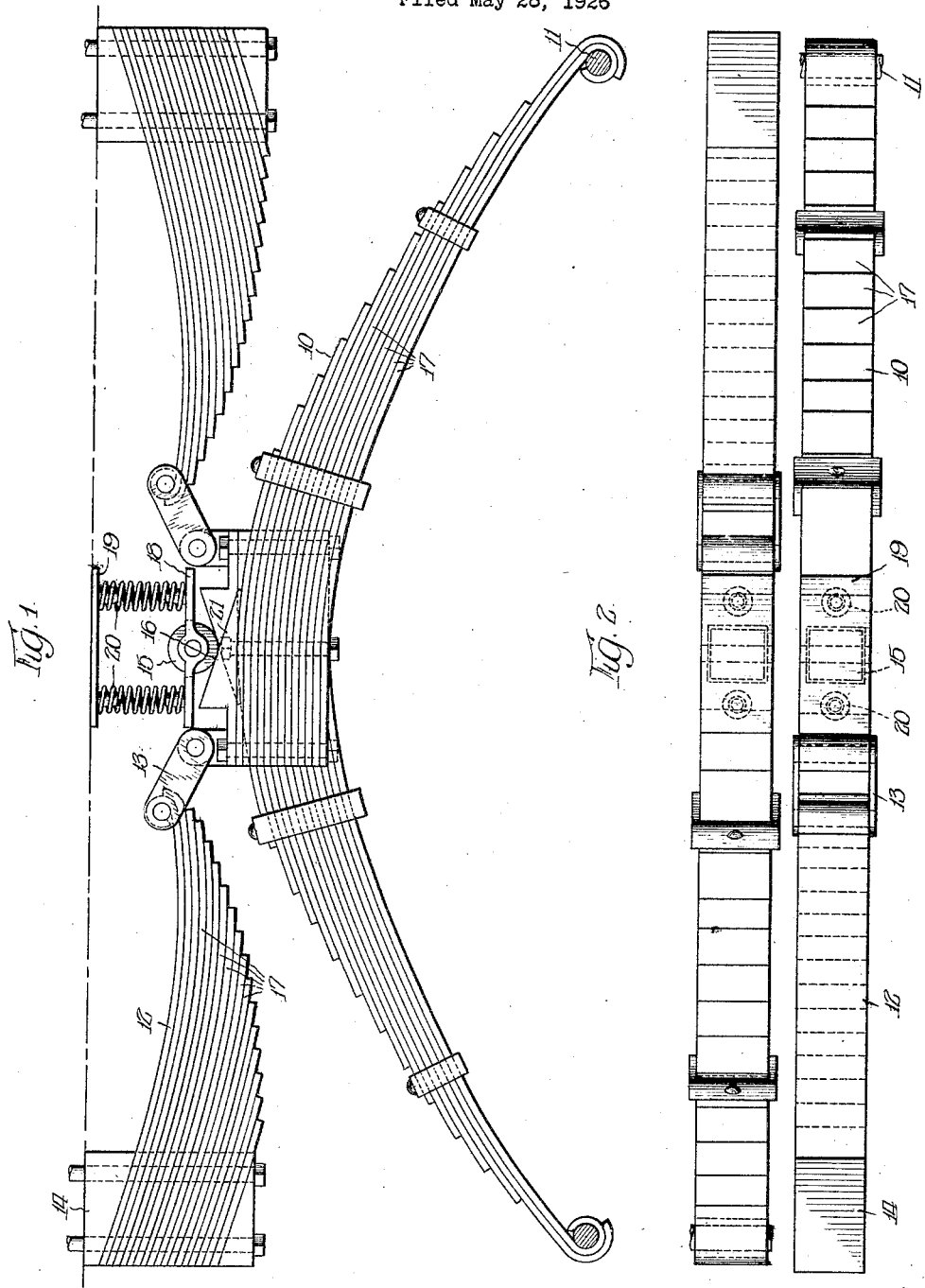
Witness:
R. Burkhardt
Inventor:
Douglas H Johannesen,
By Cromwell, Greist & Warden
                         Attys.

Patented Feb. 12, 1929.

1,702,008

UNITED STATES PATENT OFFICE.

DOUGLAS H. JOHANNESEN, OF CHICAGO, ILLINOIS.

VEHICLE SPRING.

Application filed May 28, 1926. Serial No. 112,257.

This invention relates to vehicle springs, and has for its object the provision of a novel spring arrangement which will greatly improve the riding qualities of any vehicle to which applied.

One form of the invention is herein illustrated and described, but it will be understood that such form is presented merely for the purpose of exemplification and is not intended to limit the invention short of its true spirit and scope, as defined in the appended claims.

In the accompanying drawing, a side view of a spring arrangement constructed in accordance with the invention is shown in Fig. 1, and a top view of the same is shown in Fig. 2.

The spring arrangement illustrated comprises two springs which are adapted to extend in crossed relation between two vehicle parts, such as the chassis frame and the rear axle housing.

Each spring consists of a long lower spring member 10 which is pivoted at 11 to the lower vehicle part, a short upper spring member 12 which is shackled at 13 to the spring member 10 and is fixedly secured at 14 to the upper vehicle part, and a resiliently yieldable fulcruming member 15 which is carried by the upper vehicle part in engagement with the spring member 10 at 16.

The spring members 10 and 12 are formed up from a number of spring leaves 17, and the leaves 17 are so graduated in length as to render the spring member 10 increasingly flexible toward the pivotal connection 11 and the spring member 12 increasingly flexible toward the shackle connection 13.

The fulcruming member 15 is a roller which is rotatably mounted in a bracket 18. Another bracket 19 is fixedly secured to the upper vehicle part at a point directly above the bracket 18, and a number of coil springs 20 are interposed between suitable guides on the brackets, serving to permit the bracket 18 which carries the roller 15 to yield resiliently toward the upper vehicle part. The roller 15 bears downwardly against a plate 21 which is fixedly secured to the spring member 10 near the shackle connection 13, and the bearing face of the plate 21 is preferably disposed at an inclination to the horizontal, whereby to vary the distance between the upper vehicle part and the fulcruming point as the shackled end of the spring member 10 shifts away from the fulcruming point in operation.

The spring functions in the following manner: When the rear axle housing is suddenly shifted upwardly—as when the traction wheels associated therewith encounter a raised place in the road—the lower pivoted end of the spring member 10 will also move upwardly. The spring member 10 will be flexed to a certain extent by such upward movement, but will also act as a lever of the first class about the fulcruming point 16, and the upper shackled end of the spring member 10 will as a consequence move downwardly against the yielding resistance of the spring member 12. The fulcruming member 15 will also yield upwardly to a certain extent in unison with the flexing of the spring member 12 and the combined flexing and fulcruming oscillation of the spring member 10, provided that the upward movement of the rear axle housing is sufficiently sudden and extreme.

It will be understood, of course, that the tendency of the chassis to shift laterally under the influence of the spring members 10 and 12 of the spring when in operation is neutralized by the oppositely exerted influence of the corresponding spring members of the other spring, which is arranged in spaced parallel relation to the spring described and is connected to the chassis and rear axle housing in the same manner but at opposite sides thereof.

I claim:

1. A spring arrangement for vehicles, comprising two interdependent spring devices which are intended to extend in crossed relation between two vehicle parts, each of said spring devices consisting of one spring which is connected at one end to one vehicle part and bears intermediate its ends against a fulcrum carried by the other vehicle part, and another spring which is connected at one end to the last mentioned vehicle part and at the other end to the otherwise free end of the first mentioned spring.

2. A spring arrangement for vehicles, comprising two interdependent spring devices which are intended to extend in crossed relation between two vehicle parts, each of said spring devices consisting of a long spring portion which is connected at one end to one vehicle part and bears intermediate its ends against a fulcrum carried by the other vehicle part, and a relatively short spring portion which is connected at one end to the last mentioned vehicle part and at the other end to the otherwise free end of the long spring portion.

3. A spring arrangement for vehicles, comprising two interdependent spring devices which are intended to extend in crossed relation between two vehicle parts, each of said spring devices consisting of a long spring portion which is connected at one end to one vehicle part and bears intermediate its ends against a fulcrum carried by the other vehicle part, and a relatively short spring portion which is connected at one end to the last mentioned vehicle part and at the other end to the otherwise free end of the long spring portion, the long spring portion being of increasing flexibility toward its point of connection with the vehicle part, and the short spring portion being of increasing flexibility toward its point of connection with the long spring portion.

4. A spring arrangement for vehicles, comprising two interdependent spring devices which are intended to extend in crossed relation between two vehicle parts, each of said spring devices consisting of a long spring member which is pivoted at one end to one vehicle part and is fulcrumed intermediate its ends relative to the other vehicle part, and a short spring member which is fixedly attached at one end to the last mentioned vehicle part and is loosely shackled at the other end to the otherwise free end of the long spring member.

5. A spring arrangement for vehicles, comprising two interdependent spring devices which are intended to extend in crossed relation between two vehicle parts, each of said spring devices consisting of a long spring member which is connected at one end to one vehicle part, a short spring member which is connected at one end to the other vehicle part and is connected at the other end to the otherwise free end of the long spring member, and a spring-fulcruming member which is supported by the last mentioned vehicle part and bears against the long spring member at an intermediate point.

6. A spring arrangement for vehicles, comprising two interdependent spring devices which are intended to extend in crossed relation between two vehicle parts, each of said spring devices consisting of a long spring member which is connected at one end to one vehicle part, a short spring member which is connected at one end to the other vehicle part and is connected at the other end to the otherwise free end of the long spring member, and a spring-fulcruming member which is supported by the last mentioned vehicle part and bears against the long spring member at an intermediate point near the connection with the short spring member.

7. A spring arrangement for vehicles, comprising two interdependent spring devices which are intended to extend in crossed relation between two vehicle parts, each of said spring devices consisting of a long spring member which is connected at one end to one vehicle part, a short spring member which is connected at one end to the other vehicle part and is connected at the other end to the otherwise free end of the long spring member, and a resiliently yieldable spring-fulcruming member which is supported by the last mentioned vehicle part and bears against the long spring member at an intermediate point.

8. A spring arrangement for vehicles, comprising a plurality of fulcrumed cantilever springs presenting inclined surfaces at the fulcruming points, and a plurality of fixed cantilever springs connected therewith.

9. A spring arrangement for vehicles, comprising a plurality of fulcrumed cantilever springs having wedge shaped members connected therewith at the fulcruming points, and a plurality of fixed cantilever springs connected therewith.

10. A spring arrangement for vehicles, comprising two interdependent spring devices which are intended to extend in crossed relation between two vehicle parts, each of said spring devices being fulcrumed intermediate its ends and being so constructed that the deflection obtained in the springs at points intermediate the ends thereof will be approximately as great as the deflection obtained at one end and more than that obtained at the other end.

11. The combination with the chassis and the rear axle housing of a motor vehicle, of two interdependent spring devices extending in crossed relation between the sides of the chassis and the ends of the axle housing, each of said spring devices consisting of one spring which is connected at one end to one end of the axle housing and bears intermediate its ends against a fulcrum carried by the chassis, and another spring which is connected at one end to the opposite side of the chassis and at the other end to the otherwise free end of the first mentioned spring.

In testimony whereof I have hereunto subscribed my name.

DOUGLAS H. JOHANNESEN.